(12) United States Patent
Denz et al.

(10) Patent No.: US 10,606,795 B2
(45) Date of Patent: Mar. 31, 2020

(54) METHODS FOR MANAGING A BUFFER CACHE AND DEVICES THEREOF

(71) Applicant: NetApp, Inc, Sunnyvale, CA (US)

(72) Inventors: Peter Denz, Cary, NC (US); Matthew Curtis-Maury, Apex, NC (US)

(73) Assignee: NETAPP, INC., Sunnyvale, CA (US)

( * ) Notice: Subject to any disclaimer, the term of this patent is extended or adjusted under 35 U.S.C. 154(b) by 81 days.

(21) Appl. No.: 14/743,322

(22) Filed: Jun. 18, 2015

(65) Prior Publication Data

US 2016/0371225 A1    Dec. 22, 2016

(51) Int. Cl.
   *G06F 15/16* (2006.01)
   *G06F 15/167* (2006.01)
   *H04L 29/08* (2006.01)
   *H04L 12/861* (2013.01)

(52) U.S. Cl.
   CPC .......... *G06F 15/167* (2013.01); *H04L 49/90* (2013.01); *H04L 67/1097* (2013.01)

(58) Field of Classification Search
   CPC ......... H04L 49/00; H04L 67/00; H04L 49/90; G06F 15/167
   USPC ................................................. 709/219, 213
   See application file for complete search history.

(56) References Cited

U.S. PATENT DOCUMENTS

| | | | | |
|---|---|---|---|---|
| 5,822,749 A * | 10/1998 | Agarwal | ............. | G06F 12/0866 |
| 6,523,060 B1 * | 2/2003 | Kao | ............. | G06F 5/06 |
| | | | | 370/413 |
| 7,701,949 B1 * | 4/2010 | Rose | ............. | H04L 12/5693 |
| | | | | 370/229 |
| 7,752,395 B1 * | 7/2010 | Fair | ............. | G06F 12/0866 |
| | | | | 711/133 |
| 8,117,396 B1 * | 2/2012 | Fair | ............. | G06F 12/0866 |
| | | | | 709/201 |
| 2002/0056025 A1 * | 5/2002 | Qiu | ............. | G06F 12/122 |
| | | | | 711/133 |

(Continued)

OTHER PUBLICATIONS

A. K. Datta and R. Patel, "CPU Scheduling for Power/Energy Management on Multicore Processors Using Cache Miss and Context Switch Data," in IEEE Transactions on Parallel and Distributed Systems, vol. 25, No. 5, pp. 1190-1199, May 2014 (Year: 2014).*

(Continued)

*Primary Examiner* — Melvin H Pollack
*Assistant Examiner* — Messeret F Gebre
(74) *Attorney, Agent, or Firm* — Klein, O'Neill & Singh, LLP

(57) ABSTRACT

A method, non-transitory computer readable medium, and data storage computing device that obtains data to be stored in a buffer in a buffer cache, determines a priority of the buffer based on the data, identifies one of a set of global recycle queues based on the priority, and inserts the buffer and metadata into the global recycle queue. When the global recycle queue is determined to be a lowest priority global recycle queue and the buffer is determined to be a least recently used buffer, the buffer is removed from the global recycle queue and inserted into a per-thread recycle queue. When the buffer is least recently used in the per-thread recycle queue, the buffer is removed from the per-thread recycle queue and placed in a free pool. With this technology, buffer cache can be more efficiently managed, particularly with respect to aging and scavenging operations, among other advantages.

20 Claims, 14 Drawing Sheets

(56) References Cited

U.S. PATENT DOCUMENTS

| | | | |
|---|---|---|---|
| 2006/0200456 A1* | 9/2006 | Zohar | H04L 67/322 |
| 2007/0094450 A1* | 4/2007 | VanderWiel | G06F 12/126 |
| | | | 711/133 |
| 2008/0172673 A1 | 7/2008 | Naik | |
| 2012/0089784 A1* | 4/2012 | Surtani | G06F 9/524 |
| | | | 711/136 |
| 2014/0064291 A1* | 3/2014 | Biswas | H04L 47/624 |
| | | | 370/412 |
| 2014/0223106 A1* | 8/2014 | Shivashankaraiah | |
| | | | G06F 12/0866 |
| | | | 711/136 |
| 2014/0379992 A1* | 12/2014 | Dey | G06F 12/0808 |
| | | | 711/135 |
| 2016/0117241 A1 | 4/2016 | Shah et al. | |
| 2016/0127252 A1* | 5/2016 | Tsirkin | G06F 9/45558 |
| | | | 709/238 |
| 2017/0060753 A1 | 3/2017 | Denz et al. | |

OTHER PUBLICATIONS

Kastaniotis, G., Maragos, E., Douligeris, C., & Despotis, D. K. (2012). Using data envelopment analysis to evaluate the efficiency of web caching object replacement strategies. Journal of Network and Computer Applications, 35(2), 803-17. (Year: 2012).*

Y. Lin, B. Li and B. Liang, "Differentiated Data Persistence with Priority Random Linear Codes," 27th International Conference on Distributed Computing Systems (ICDCS '07), Toronto, ON, 2007, pp. 47-47. (Year: 2007).*

Non-Final Office Action on co-pending U.S. Appl. No. 14/839,450 dated Jun. 16, 2017.

Final Office Action on co-pending U.S. Appl. No. 14/839,450 dated Nov. 29, 2017.

Notice of Allowance on co-pending U.S. Appl. No. 14/839,450 dated Apr. 19, 2018.

* cited by examiner

_(1)_

METHODS FOR MANAGING A BUFFER CACHE AND DEVICES THEREOF

FIELD

This technology relates to data storage and, more particularly, to methods and devices for managing a buffer cache in a data storage computing device.

BACKGROUND

Enterprises increasingly need to store large amounts of data in data storage computing devices, or filers, and require that the data be accessible in an efficient manner. Data storage computing devices often implement a buffer cache as a repository for cached disk block reads and writes that are maintained in the form of buffers that can be used to service future reads to data storage blocks more efficiently. A buffer cache can be implemented in random access memory (RAM) media to provide relatively fast retrieval of buffer contents.

In order to optimize buffer cache performance, the buffers are maintained in a priority queue so that buffers that are expected to be least likely to be needed in the future can be quickly identified. Buffers can be prioritized based on the type of data represented by the buffer (e.g., a user file or system metadata), buffer tree level, or frequency of use of the buffer, for example. New buffers are continuously requested and lower priority buffers that are least likely to be needed in the future are evicted to service such requests.

Data storage computing devices are increasingly complex, and often have multiprocessing capabilities. One option to improve parallelism in a buffer cache system hosted on a multiprocessor data storage computing device is to associate buffers and recycle queues with threads for lockless processing. However, buffers associated with threads are not necessarily uniformly distributed or deprioritized after not being used for an extended time duration, referred to herein as aging. Accordingly, heuristic distributed algorithms have been developed for buffer cache operations, such as aging and scavenging, that facilitate buffer eviction or the return of buffers to a free pool.

In a distributed environment, heuristic-based aging algorithms may not always yield fair aging across threads. Aging within fixed queues may require visiting individual buffers to make an aging decision, making this an expensive operation. Additionally, current scavenging algorithms rely on an approximation for buffer priority and, therefore, often result in scavenging important buffers associated with one thread before less important buffers associated with another thread. Accordingly, current algorithms used to operate buffer caches have significant limitations and are not particularly effective.

SUMMARY

A method for managing a buffer cache includes obtaining, by a data storage computing device, data to be stored in a buffer in a buffer cache. A priority of the buffer is determined based on a type of the data. One global recycle queue in a set of global recycle queues is identified based on the priority. The buffer and metadata are inserted into the global recycle queue, wherein the metadata includes at least a thread identifier corresponding to a thread associated with the data. The set of global recycle queues is sorted, by the data storage computing device, when the global recycle queue is determined to be a lowest priority one of the set of global recycle queues and the buffer is a least recently used one of one or more buffers in the global recycle queue. In order to sort the set of global recycle queues, the buffer is removed from the global recycle queue and inserted into a per-thread recycle queue identified based on the thread identifier. The buffer in the per-thread recycle queue is scavenged, by the data storage computing device, when the buffer is determined to be a least recently used one of one or more buffers in the per-thread recycle queue. In order to scavenge the buffer in the per-thread recycle queue, the buffer is removed from the per-thread recycle queue and placed in a free pool.

A non-transitory computer readable medium having stored thereon instructions for managing a buffer cache comprising executable code which when executed by a processor, causes the processor to perform steps including obtaining data to be stored in a buffer in a buffer cache. A priority of the buffer is determined based on a type of the data. One global recycle queue in a set of global recycle queues is identified based on the priority. The buffer and metadata are inserted into the global recycle queue, wherein the metadata includes at least a thread identifier corresponding to a thread associated with the data. The set of global recycle queues is sorted when the global recycle queue is determined to be a lowest priority one of the set of global recycle queues and the buffer is a least recently used one of one or more buffers in the global recycle queue. In order to sort the set of global recycle queues, the buffer is removed from the global recycle queue and inserted into a per-thread recycle queue identified based on the thread identifier. The buffer in the per-thread recycle queue is scavenged when the buffer is determined to be a least recently used one of one or more buffers in the per-thread recycle queue. In order to scavenge the buffer in the per-thread recycle queue, the buffer is removed from the per-thread recycle queue and placed in a free pool.

A data storage computing device includes a processor and a memory coupled to the processor which is configured to be capable of executing programmed instructions comprising and stored in the memory to obtain data to be stored in a buffer in a buffer cache. A priority of the buffer is determined based on a type of the data. One global recycle queue in a set of global recycle queues is identified based on the priority. The buffer and metadata are inserted into the global recycle queue, wherein the metadata includes at least a thread identifier corresponding to a thread associated with the data. The set of global recycle queues is sorted when the global recycle queue is determined to be a lowest priority one of the set of global recycle queues and the buffer is a least recently used one of one or more buffers in the global recycle queue. In order to sort the set of global recycle queues, the buffer is removed from the global recycle queue and inserted into a per-thread recycle queue identified based on the thread identifier. The buffer in the per-thread recycle queue is scavenged when the buffer is determined to be a least recently used one of one or more buffers in the per-thread recycle queue. In order to scavenge the buffer in the per-thread recycle queue, the buffer is removed from the per-thread recycle queue and placed in a free pool.

This technology has a number of associated advantages including providing methods, non-transitory computer readable media, and devices that more effectively operate buffer caches on data storage computing devices. In particular, this technology facilitates global prioritization of buffers across threads via a set of global recycle queues and a two stage scavenging via a set of per-thread recycle queues. Accordingly, this technology provides implicit aging of buffers that is relatively inexpensive, improved distributed scavenging, and reduced lock contention. Additionally, this technology advantageously provides a set of holding queues for maintaining relatively important buffers, after sorting buffers in a first scavenging stage, thereby reducing the likelihood that buffers associated with system metadata, for example, are disproportionately or unfairly scavenged.

DETAILED DESCRIPTION

Figure 1:
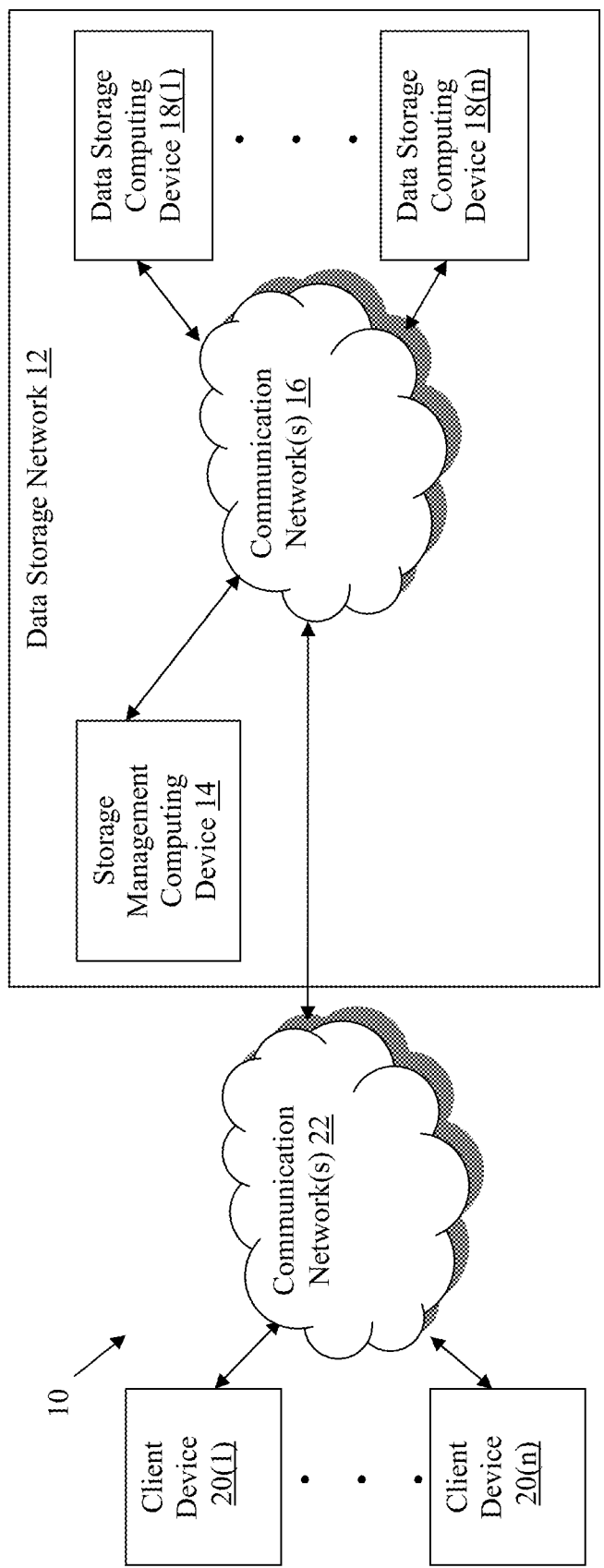
FIG. 1 a block diagram of a network environment with an exemplary data storage network with exemplary data storage computing devices.

A network environment 10 including an example of a data storage network 12 is illustrated in FIG. 1. The data storage network 12 in this particular example includes a storage management computing device 14 coupled by communication network(s) 16 to data storage computing devices 18(1)-18(n). The storage management computing device 14 is coupled to a plurality of client devices 20(1)-20(n) by communication network(s) 22. In other examples, this environment 10 can include other numbers and types of systems, devices, components, and/or elements in other configurations. This technology provides a number of advantages including methods, non-transitory computer readable media, and devices that facilitate more efficient operation of a buffer cache via implicit aging of buffers and improved distributed scavenging.

Figure 2:
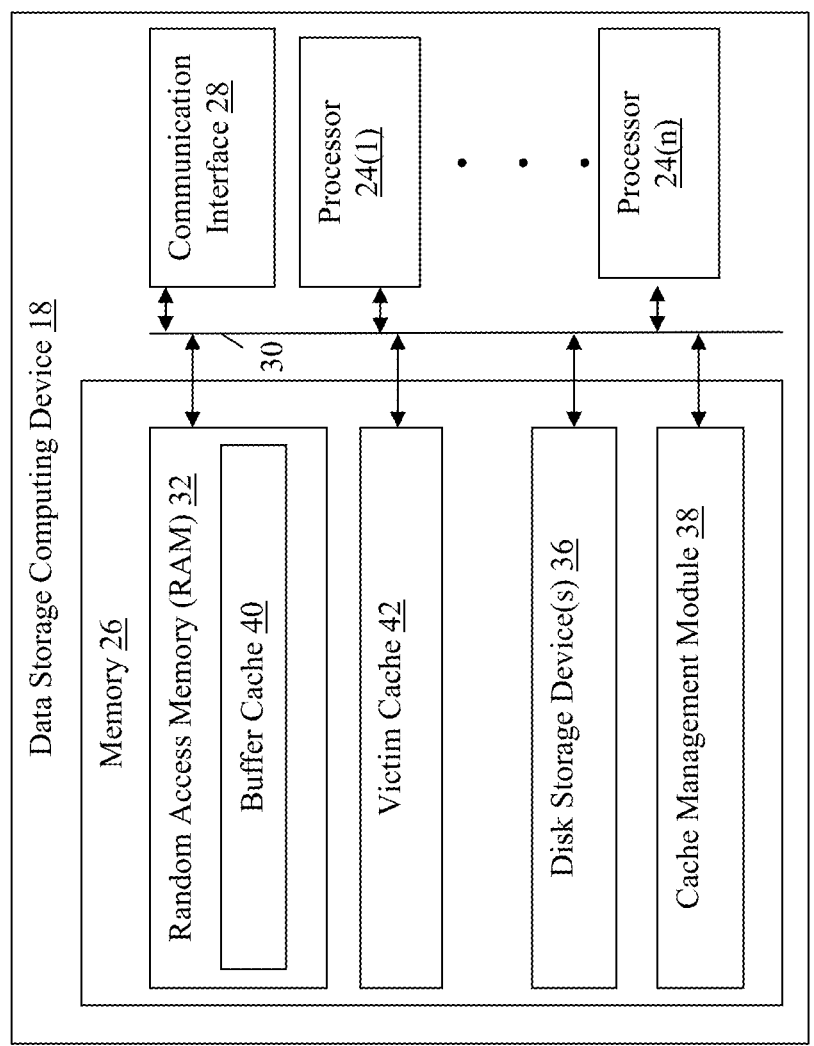
FIG. 2 is a block diagram of one of the exemplary data storage computing devices.

Referring to FIG. 2, a block diagram of one of the exemplary data storage computing devices 18(1)-18(n) is illustrated. The data storage computing device 18 is generally configured to receive requests to write data to storage devices and to read data from the storage devices. The data storage computing device 18 in this particular example includes processors 24(1)-24(n), a memory 26, and a communication interface 28, which are all coupled together by a bus 30 or other communication link, although the data storage computing device 18 can have other types and numbers of components or other elements.

The processors 24(1)-24(n) of the data storage computing device 18 each executes a program of stored instructions for one or more aspects of this technology, as described and illustrated by way of the embodiments herein, although the processors 24(1)-24(n) could execute other numbers and types of programmed instructions. The processors 24(1)-24(n) in the data storage computing device 18 may include one or more central processing units or general purpose processors with one or more processing cores, for example.

The memory 26 of the data storage computing device 18 in this particular example includes random access memory (RAM) 32, victim cache 42, disk storage device(s) 36, and a cache management module 38, although the memory 26 may include any of various forms of read only memory (ROM), RAM, Flash memory, non-volatile, or volatile memory, or the like, or a combination of such devices for example.

The RAM 32 in this example includes a buffer cache 40, although the buffer cache can be located elsewhere and/or in another type of medium. The buffer cache 40 in this example is a repository for cached reads and writes associated with blocks of the disk storage device(s) 36 that are maintained in the form of buffers that can be used to service future reads to data storage blocks more efficiently.

The victim cache 42 stores buffers and other information in a medium such as flash that is slower than the RAM 32 but faster than the disk storage device(s) 36, although any other type of memory can be used for the victim cache 42 in other examples.

The disk storage device(s) 36 can include optical disk-based storage or any other type of storage devices suitable for storing files or objects for short or long term retention, for example. Other types and numbers of storage devices can be included in the memory 26 or coupled to the data storage computing device 18 in other examples. Additionally, one or more disk shelves with storage devices can be included in the data storage network 12 in one or more separate or dedicated storage servers in other examples.

The cache management module 38 manages or operates the buffer cache 40 and the victim cache 42. Generally, the cache management module 38 populates the buffer cache 40 and the victim cache 42, determines when resources need to be freed into the free pool, and manages aging and scavenging operations for the buffer cache 40 and the victim cache 42, as described and illustrated in more detail later.

The communication interface 28 of the data storage computing device 18 in this example operatively couples and communicates between the data storage computing device 18 and the storage management computing device 14 and the client devices 20(1)-20(n) via the communication network(s) 16 and/or 22, although other types and numbers of communication networks or systems with other types and numbers of connections and configurations to other devices and elements can also be used.

By way of example only, the communication network(s) 16 and 22 can use TCP/IP over Ethernet and industry-standard protocols, including NFS, CIFS, SOAP, XML, LDAP, and SNMP, although other types and numbers of communication networks, can be used. The communication network(s) 16 and 22 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

Referring back to FIG. 1, the storage management computing device 14 receives requests to write and read data from the client devices 20(1)-20(n) via the communication network(s) 16 and/or 22 and communicates with the data storage computing devices 18(1)-18(n) in order to service the requests. Accordingly, the storage management computing device 14 in this example includes a processor, a memory, and a communication interface, which are all coupled together by a bus or other communication link, although the storage management computing device 14 can have other types and numbers of components or other elements.

Each of the client devices 20(1)-20(n) includes a processor, a memory, a communication interface, and, optionally, an input device and a display device, which are coupled together by a bus or other communication link, although the client devices 20(1)-20(n) can have other types and numbers of components or other elements. The client devices 20(1)-20(n) may communicate with the storage management computing device 14 and/or the data storage computing devices 18(1)-18(n) to store and retrieve data. One or more of the client devices 20(1)-20(n) may be, for example, a conventional personal computer, a server hosting application(s) that utilize back-end storage provided by the data storage network 12, or any other type of processing and/or computing device.

Although examples of the storage management computing device 14, data storage computing devices 18(1)-18(n), and client devices 20(1)-20(n) are described herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples also may be embodied as one or more non-transitory computer readable media having instructions stored thereon for one or more aspects of the present technology, as described and illustrated by way of the examples herein, which when executed by a processor, cause the processor to carry out the steps necessary to implement the methods of this technology, as described and illustrated with the examples herein.

Figure 3A:
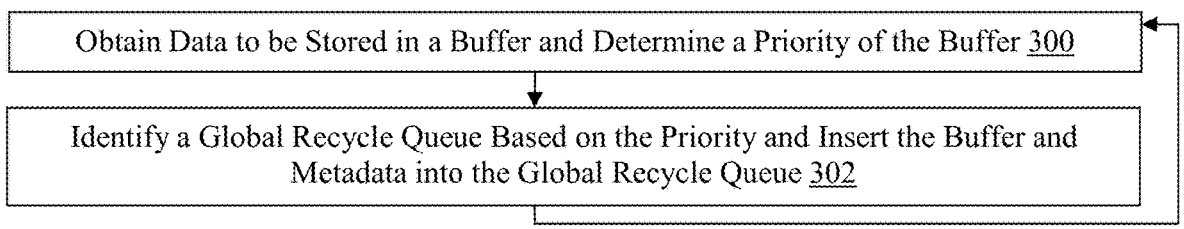
FIG. 3A-3D are flowcharts of an exemplary method for managing a buffer cache with the exemplary data storage computing device.

An exemplary method for managing a buffer cache will now be described with reference to FIGS. 1-12. Referring more specifically to FIG. 3A, an exemplary method for inserting buffers into the buffer cache 40 is illustrated. In step 300 in this particular example, the data storage computing device 18 obtains data to be stored in a buffer in the buffer cache 40 and determines a priority of the buffer. The data can be identified by the cache management module 38 based on a stored policy or set of rules and can correspond to data read from the disk storage device(s) 36 in response to a request received from one of the client devices 20(1)-20(n), for example. In other examples, the data may be system data or metadata, and other types of data can also be obtained for storage in a buffer in the buffer cache 40. The priority of the buffer can be determined based on the data, such as a type of the data (e.g., user or system), although the priority can be determined based on other parameters in other examples.

In step 302, the data storage computing device 18 identifies one of a set of global recycle queues based on the priority and inserts the buffer and metadata into the one global recycle queue. The metadata in this particular example includes at least a thread identifier for a thread (also referred to herein as an affinity or "Aff") associated with the data. Optionally the metadata also includes a timestamp including a time at which the buffer is inserted and other information can also be stored along with the buffer as associated metadata. Subsequent to inserting the buffer into the one global recycle queue, the data storage computing device 18 proceeds back to step 300 and steps 300-302 are repeated for a plurality of buffers.

Figure 4:
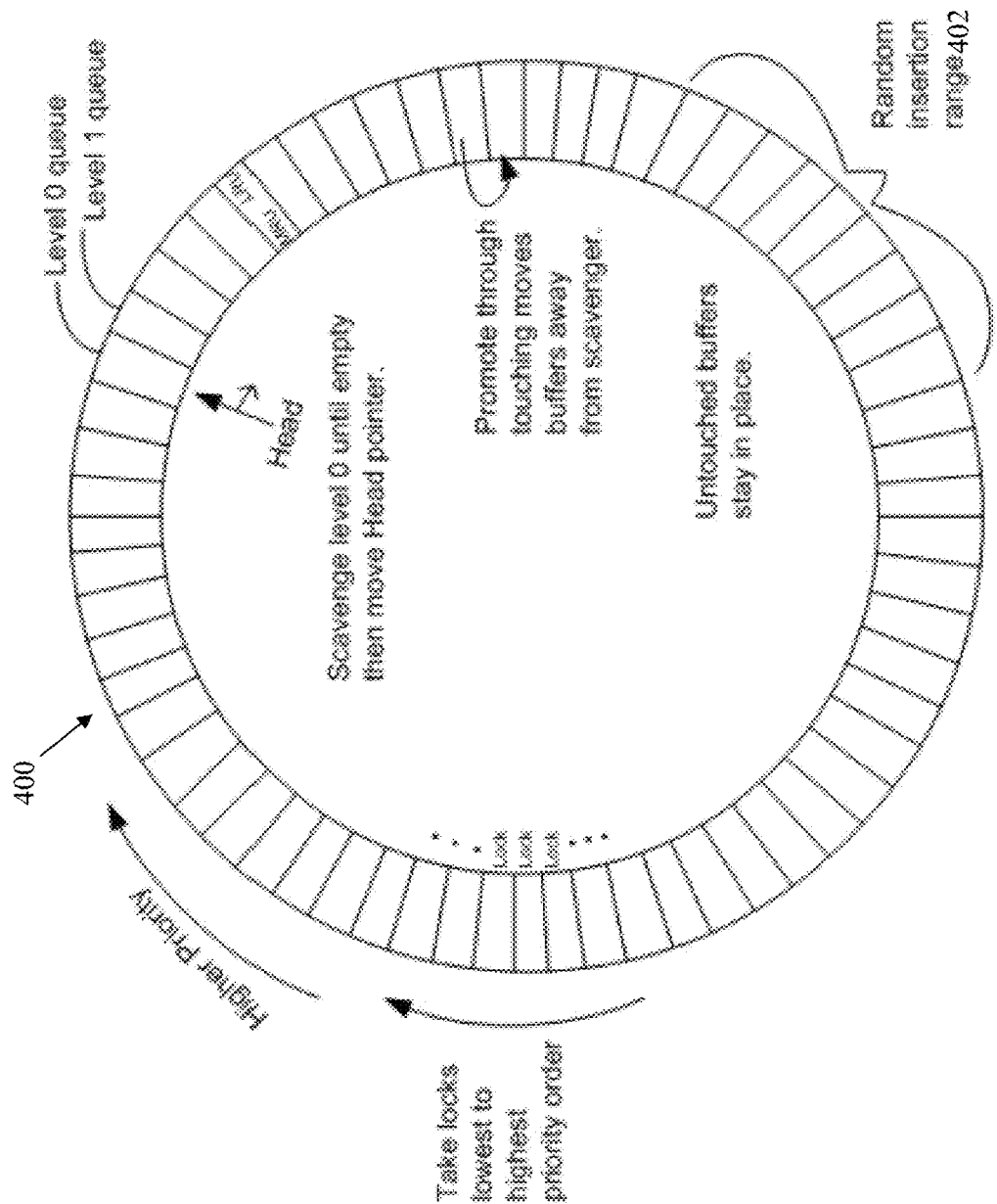
FIG. 4 is a block diagram of an exemplary set of global recycle queues.

Referring to FIG. 4, a block diagram of an exemplary set of global recycle queues 400 is illustrated. In this example, each of the global recycle queues in the set of global recycle queues 400 is capable of holding a plurality of buffers in a most recently used to least recently used order. Each global recycle queue in the set of global recycle queues 400 has an associated priority level and the set of global recycle queues 400 is organized based on the associated priority level of each of the global recycle queues from a lowest priority to a highest priority. The set of global recycle queues 400 is circular in this example and, accordingly, the lowest priority global recycle queue in the set of set of global recycle queues 400 is identified based on a head pointer, as described and illustrated in more detail later.

Optionally, the one of the set of global recycle queues 400 into which the buffer is inserted can be identified based on a random selection from an established insertion window 402 or range corresponding to a subset of global recycle queues in the set of global recycle queues 400. Since a significant proportion of the buffers may store user data having substantially the same priority upon insertion, utilizing a random selection within the insertion window 402 distributes the buffers within the insertion window 402 in the set of global recycle queues 400. As the processors 24(1)-24(n) lock an entire global recycle queue in order to access a buffer held by the global recycle queue, distributing the buffers within the insertion window 402 advantageously reduces the occurrence of lock contention among the processors 24(1)-24(n).

Figure 3B:
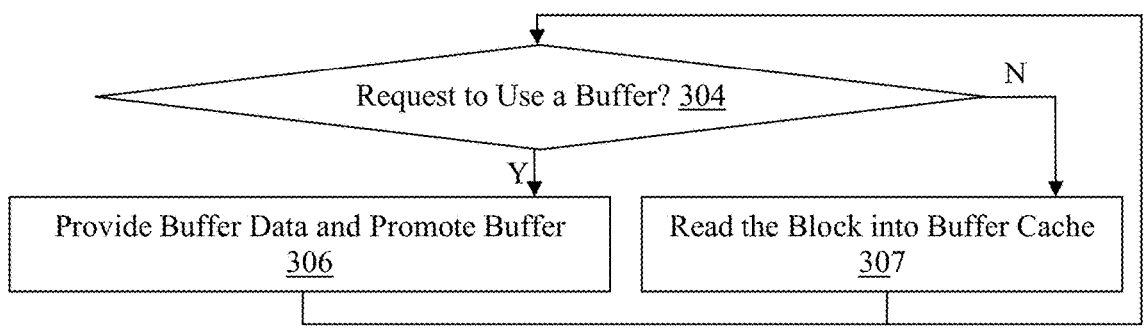

Referring to FIG. 3B, an exemplary method of accessing and promoting buffers in the buffer cache 40 is illustrated. In step 304, the data storage computing device 18 determines whether a request to use, or touch, a buffer has been received, such as from a thread that requires data associated with the buffer, for example, although buffers can be requested from other sources and for other reasons. The request can be to use a buffer inserted as described and illustrated earlier with reference to FIG. 3A or any other buffer currently maintained in the buffer cache 40. If the data storage computing device determines that a request to use a buffer has been received, then the Yes branch is taken to step 306.

In step 306, the data storage computing device 18 provides the data associated with the requested buffer and either moves the buffer to a most recently used end of the associated one of the set of global recycle queues 400, and increments a counter stored in the metadata for the buffer, or promotes the buffer to a higher priority one of the set of global recycle queues 400 if the data storage computing device 18 determines that the buffer has been touched a threshold number of times based on the counter.

Moving and/or promoting buffers can be managed by the cache management module 38, for example, and can include modifying pointers stored in the metadata associated with each of the one or more buffers maintained by each of the global recycle queues in the set of global recycle queues 400. The pointers include an address of a next and a previous buffer such that the each of the global recycle queues in the set of global recycle queues 400 includes a doubly-linked list of buffers.

More specifically, in order to retrieve and move the buffer, one of the processors 24(1)-24(n) executing a thread requesting the buffer can take a lock on one of the set of global recycle queues 400 holding the buffer, when the one of the set of global recycle queues 400 is released if currently locked by another of the processors 24(1)-24(n). Next, the one of the processors 24(1)-24(n) can retrieve and provide the buffer data, replace pointer(s) in other buffer(s) in the same one of the set of global recycle queues 400 to maintain the most recently used to least recently used order in the doubly-linked list, and release the lock. The locking mechanism can be implemented based on metadata associated with each of the global recycle queues in the set of global recycle queues 400 and stored in the buffer cache 40.

In examples in which the data storage computing device 18 determines that the buffer should be promoted, the one of the processors 24(1)-24(n) can take a lock on the one of the set of global recycle queues 400, when the one of the set of global recycle queues 400 is released if currently locked by another of the processors 24(1)-24(n). Next, one of the processors 24(1)-24(n) can retrieve and provide the buffer data, replace pointer(s) in other buffer(s) in the same one of the set of global recycle queues 400 to remove the buffer from the doubly-linked list, and release the lock.

Then, one of the processors 24(1)-24(n) can take an additional lock on another higher priority one of the set of global recycle queues 400, when another of the set of global recycle queues 400 is released if currently locked by another of the processors 24(1)-24(n), insert the buffer into another one of the set of global recycle queues 400 by replacing pointer(s) to insert the buffer as the most recently used buffer in the doubly linked list, and release the additional lock. Other methods for moving or promoting buffers, implementing locks, or organizing each of the global recycle queues in the set of global recycle queues 400 can also be used.

Referring back to step 304, if the data storage computing device 18 determines that a request to use a buffer has not been received then the No branch is taken to step 307. In step 307, the data storage computing device 18 reads a block into the buffer cache, such as from one of the disk storage devices 36, for example. Subsequent to providing the buffer data or reading the block, the data storage computing device proceeds back to step 304.

Figure 3C:
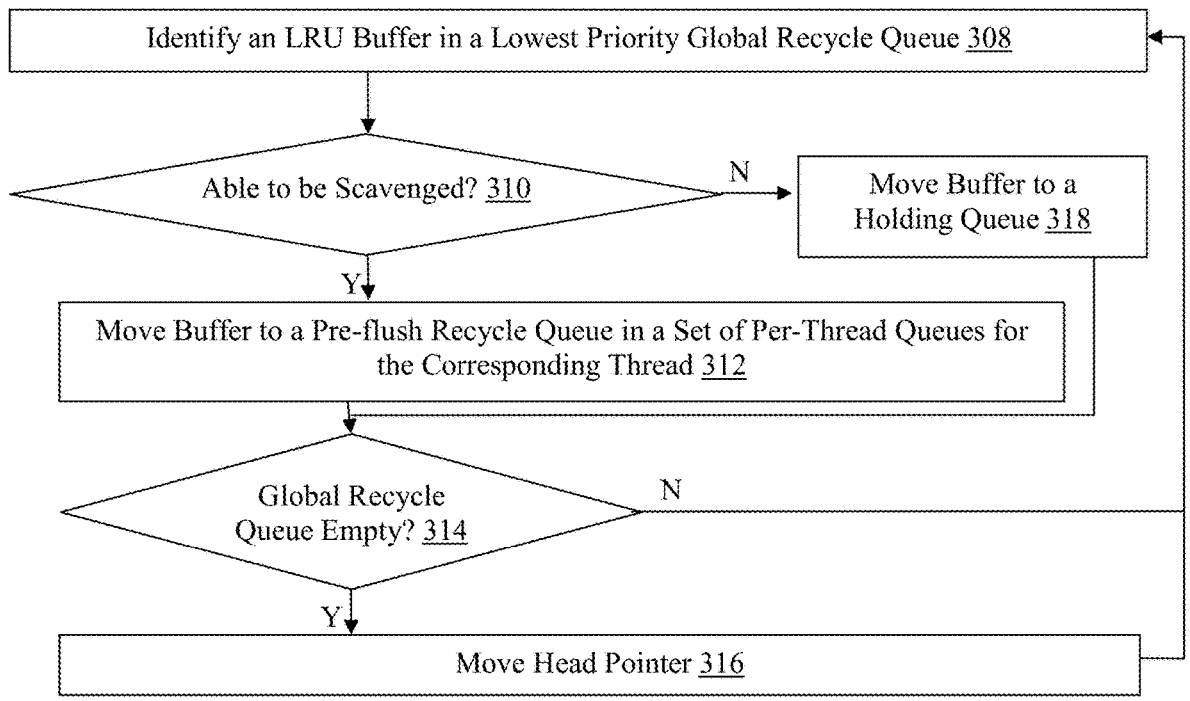

Referring to FIG. 3C, an exemplary method for sorting the set of global recycle queues 400 in a first scavenging stage is illustrated. In step 308, the data storage computing device 18 identifies a least recently used buffer in a lowest priority one of the set of global recycle queues 400. The lowest priority one of the set of global recycle queues 400 can be identified based on the head pointer maintained by the cache management module 38. The least recently used buffer can be identified based on the inherent order and organization of the lowest priority one of the set of global recycle queues 400. More specifically, the next and previous pointers associated with each buffer in one of the set of the global recycle queues 400 are modified when a most recently used buffer is inserted into, and a least recently used buffer is removed from, the one of the set of the global recycle queues 400. Accordingly, the least recently used buffer will not have a next or last pointer, depending on the specific order that is used, pointing to another buffer in the same one of the set of the global recycle queues 400.

Figure 5:
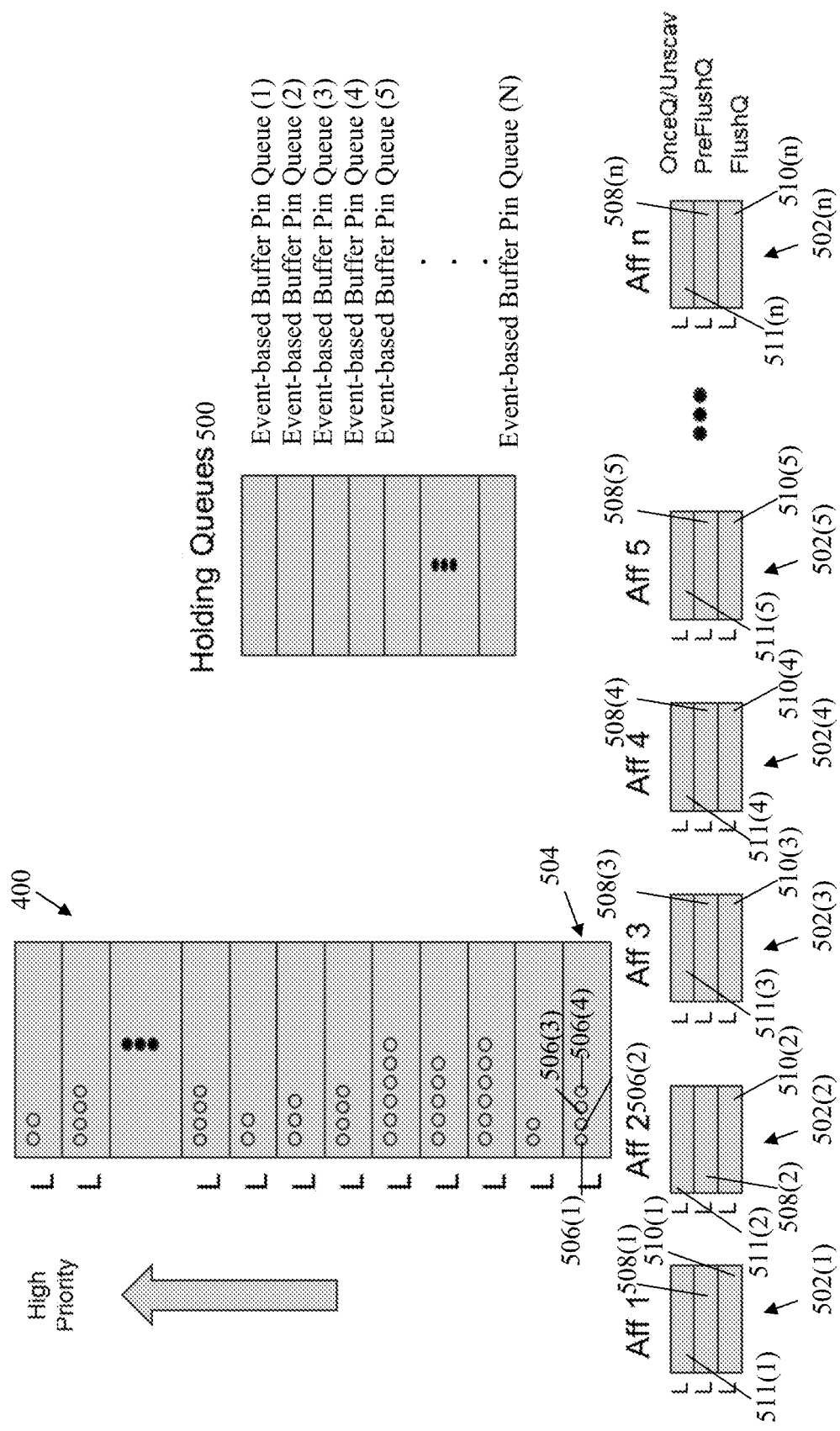
FIG. 5 is a block diagram of the exemplary set of global recycle queues, an exemplary set of holding queues, and an exemplary set of per-thread recycle queues.

Referring to FIG. 5 a block diagram of the set of global recycle queues 400, an exemplary set of holding queues 500, and an exemplary set of per-thread recycle queues 502(1)-502(n) for each of a plurality of threads is illustrated prior to any sorting or scavenging. In this example, the global recycle queue 504 is the lowest priority one of the set of global recycle queues 400 and it includes four buffers 506(1), 506(2), 506(3), and 506(4). Additionally, in this example, each of the sets of per-thread recycle queues 502(1)-502(n) includes a pre-flush queue 508(1)-508(n), a flush queue 510(1)-510(n), and a once queue 511(1)-511(n).

While optional pre-flush queues 508(1)-508(n) and once queues 511(1)-511(n) are included in each of the sets of per-thread recycle queues 502(1)-502(n) in this example, in other examples, only flush queues 510(1)-510(n) can be used. The pre-flush queues 508(1)-508(n) are used to facilitate movement of buffers to the optional victim cache 42, as described and illustrated in more detail later. The once queue 511(1)-511(n) holds buffers that are speculatively read-head or expected to only be accessed one time in the future. When the buffers are accessed that one time, they are immediately scheduled for scavenging. If a buffer is not accessed within a fixed time period from being read, then the buffer is expired and scavenged.

Referring back to FIG. 3C, in step 310, the data storage computing device 18 determines whether the buffer identified in step 308 is able to be scavenged, such as based on metadata associated with the buffer. Accordingly, the cache management module 38, for example, can insert metadata associated with the buffer to indicate that the buffer is associated with system data, for example, and is a relatively important or high priority buffer that should be treated differently than other buffers. If the data storage computing device 18 determines that the buffer is able to be scavenged, then the Yes branch is taken to step 312.

In step 312, the data storage computing device 18 moves the buffer to a pre-flush queue for a corresponding thread. The thread corresponding to the buffer can be determined from a thread identifier stored in the metadata associated with the buffer, as described and illustrated in more detail earlier with reference to step 302 of FIG. 3A, for example. The buffer can be moved by removing the buffer from the set of global recycle queues 400 and into the pre-flush queue for the corresponding thread using the associated locks, as described and illustrated earlier.

Figure 6:
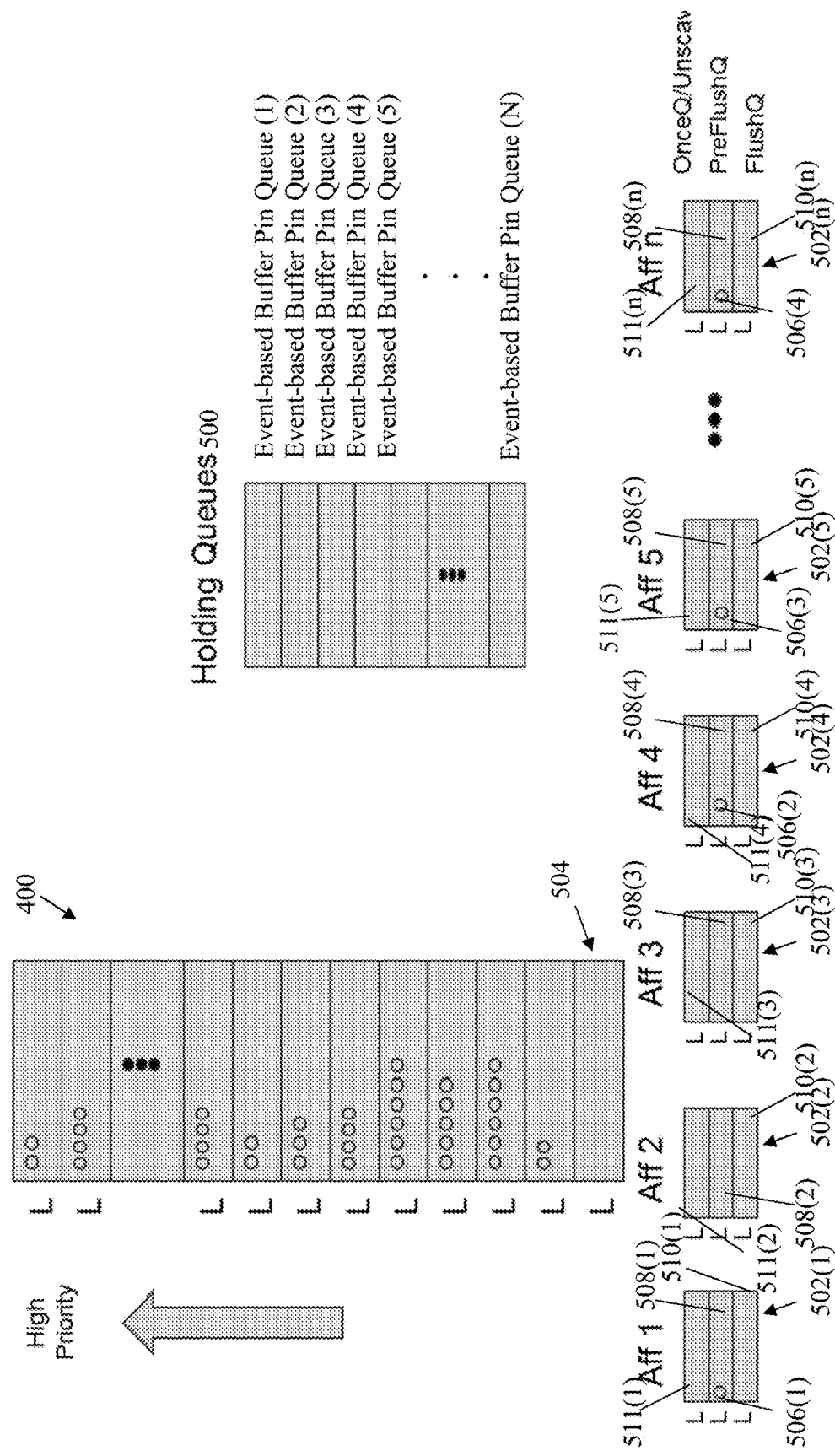
FIG. 6 is a block diagram of the exemplary set of global recycle queues, the exemplary set of holding queues, and the exemplary set of per-thread recycle queues subsequent to sorting the exemplary set of global recycle queues.

Referring to FIG. 6 a block diagram of the exemplary set of global recycle queues 400, the exemplary set of holding queues 500, and the exemplary set of per-thread recycle queues 502(1)-502(n) subsequent to four iterations of sorting the exemplary set of global recycle queues 400, as described with reference to steps 308-312 of FIG. 3, is illustrated. In this particular example, the four buffers 506(1), 506(2), 506(3), and 506(4) are all moved to a pre-flush queue 508(1)-508(n) of a one of the sets of per-thread recycle queues 502(1)-502(n), respectively, for a corresponding thread.

Referring back to FIG. 3C, in step 314, the data storage computing device 18 determines whether the lowest priority global recycle queue 504 is empty. If the data storage computing device 18 determines that the lowest priority global recycle queue 504 is empty, then the Yes branch is taken to step 316.

In step 316, the data storage computing device 18 moves the head pointer so that the head pointer corresponds to an address or identifier of a new lowest priority one of the set of global recycle queues 400. Accordingly, by moving the head pointer, the data storage computing device 18 implements implicit aging without walking any of the set of the global recycle queues 400. With the exception of the previous lowest priority global recycle queue, the global recycle queues in the set of global recycle queues 400 will all become closer to the head pointer, and the buffers held therein will become closer to being scavenged, as described and illustrated in more detail later. Additionally, the previous lowest priority global recycle queue will become the highest priority one of the global recycle queues 400 as it will be furthest away from the head pointer.

Figure 7:
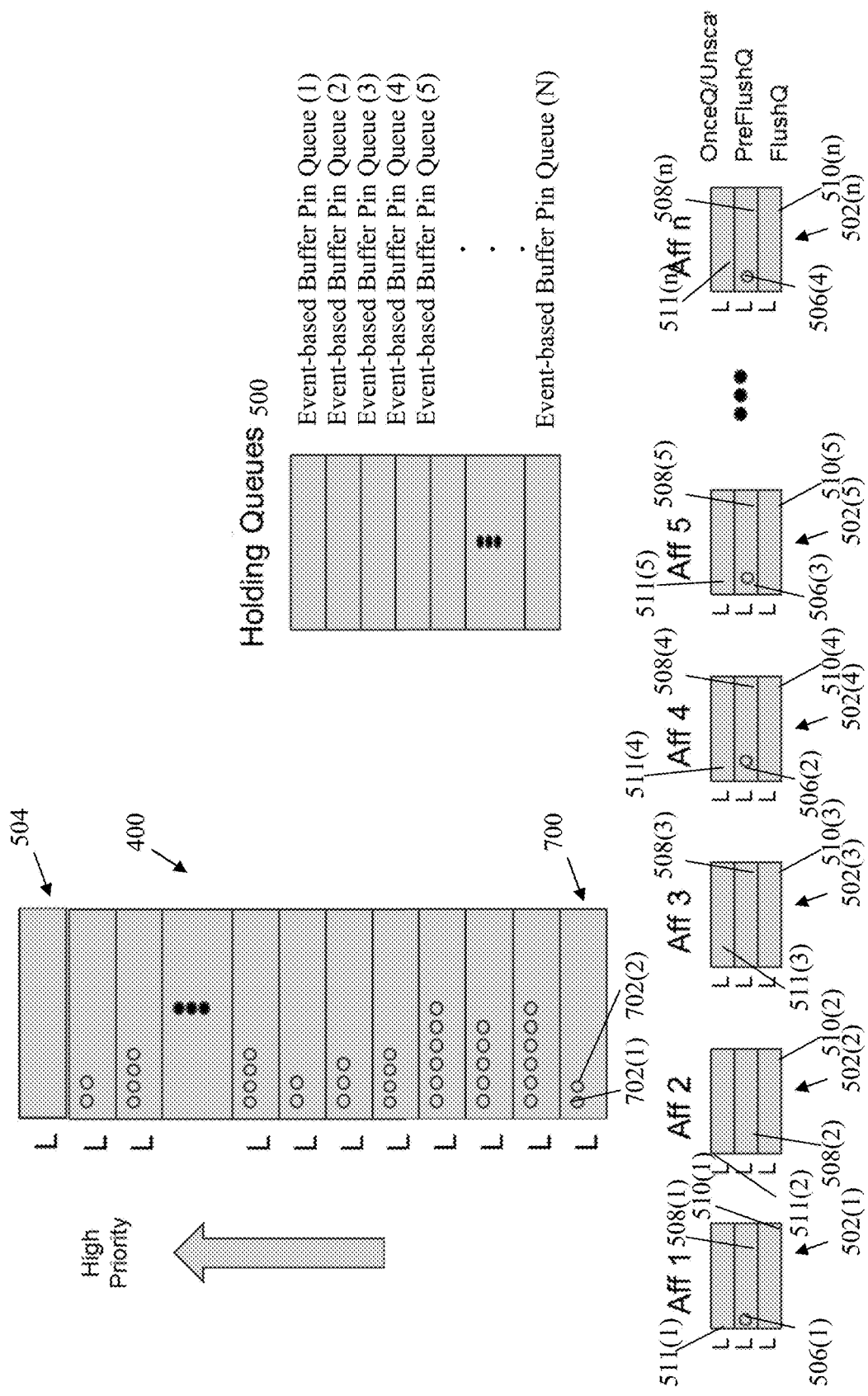
FIG. 7 is a block diagram of the exemplary set of global recycle queues, the exemplary set of holding queues, and the exemplary set of per-thread recycle queues subsequent to an implicit aging.

Referring back to FIG. 6, in this example, the lowest priority global recycle queue 504 is empty after the four iterations of steps 308-312. Accordingly, the head pointer will be moved. Referring to FIG. 7, a block diagram of the exemplary set of global recycle queues 400, the exemplary set of holding queues 500, and the exemplary set of per-thread recycle queues 502(1)-502(n) subsequent to an implicit aging implemented as described and illustrated with reference to step 316 is illustrated. In this example, the global recycle queue 504 has become the highest priority global recycle queue and the global recycle queue 700 has become the lowest priority recycle queue via the movement of the head pointer. The global recycle queue 700 includes two buffers 702(1) and 702(2).

Referring back to FIG. 3C, if the data storage computing device 18 determines in step 310 that the buffer is not able to be scavenged, then the No branch is taken to step 318. In step 318, the data storage computing device 18 moves the buffer identified in step 308 to one of a set of holding queues. The particular holding queue to which the buffer is moved can be determined based on the associated type of data, workload, or consistency point, and/or any number of other parameters. The buffer can be moved by removing the buffer from the set of global recycle queues 400 and into the set of holding queues using the associated locks, as described and illustrated earlier. In this example, the holding queues hold buffers that would normally be scavenged, but cannot because they are needed to be kept around until some future event occurs. Once this event occurs, the buffers in the respective holding queue become available to be scavenged.

Figure 8:
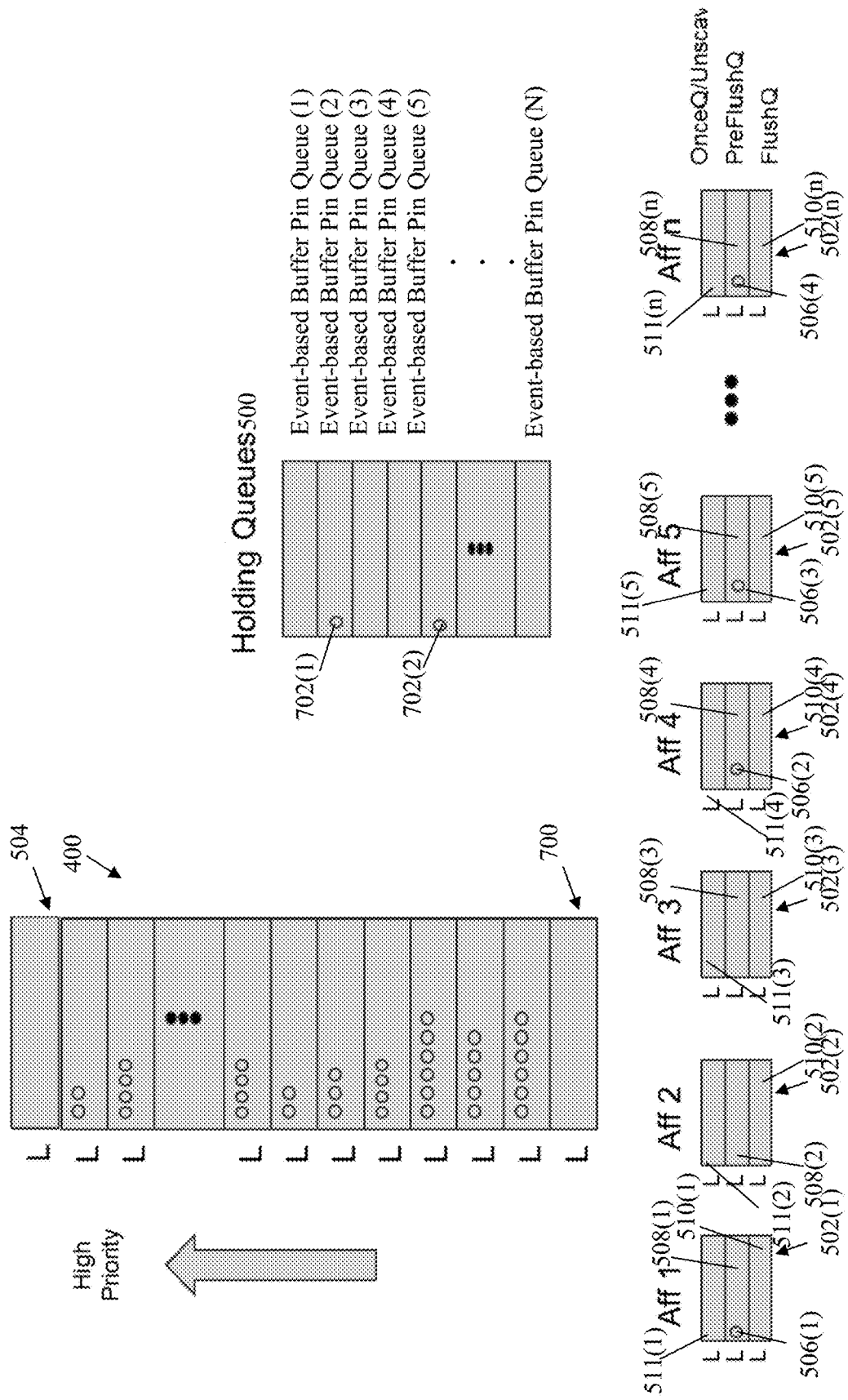
FIG. 8 is a block diagram of the exemplary set of global recycle queues, the exemplary set of holding queues, and the exemplary set of per-thread recycle queues subsequent to a second sorting of the exemplary set of global recycle queues.

Referring to FIG. 8, a block diagram of the exemplary set of global recycle queues 400, the exemplary set of holding queues 500, and the exemplary set of per-thread recycle queues 502(1)-502(n) subsequent to two iterations of sorting the exemplary set of global recycle queues 400, as described with reference to steps 308-310 and 318 of FIG. 3, is illustrated. In this example, the two buffers 702(1) and 702(2) have both been moved from the lowest priority global recycle queue 700 to respective queues in the set of holding queues 500.

Referring back to FIG. 3C, subsequent to moving the buffer in step 318, the data storage computing device 18 determines whether the lowest priority global recycle queue is empty in step 314, as described and illustrated earlier. If the data storage computing device 18 determines that the lowest priority global recycle queue is empty in this iteration, then the Yes branch is again taken to step 316 and the head pointer is moved, as described and illustrated earlier.

Figure 9:
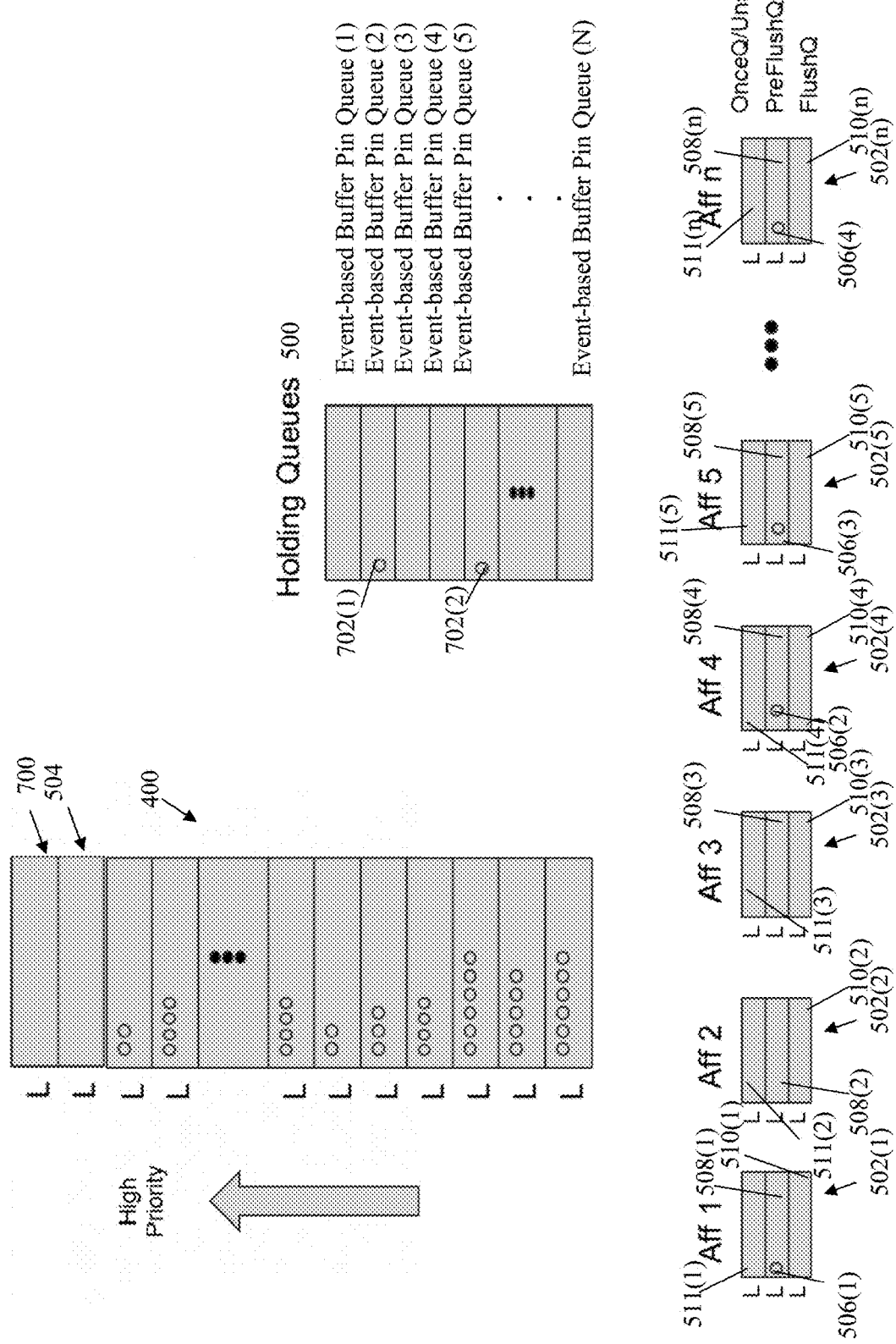
FIG. 9 is a block diagram of the exemplary set of global recycle queues, the exemplary set of holding queues, and the exemplary set of per-thread recycle queues subsequent to another implicit aging.

Referring to FIG. 9 a block diagram of the exemplary set of global recycle queues 400, the exemplary set of holding queues 500, and the exemplary set of per-thread recycle queues 502(1)-502(n) subsequent to another implicit aging is illustrated. In this particular example, the lowest priority global recycle queue 700 is empty subsequent to moving the buffers 702(1) and 702(2) to the set of holding queues 500. Accordingly, the global recycle queue 700 has become the highest priority global recycle queue via the movement of the head pointer.

Referring back to FIG. 3C, subsequent to moving the head pointer in step 316, or if the data storage computing device 18 determines in step 314 that the lowest priority one of the set of global recycle queues 400 is not empty and the No branch is taken, then the data storage computing device 18 proceeds back to step 308 and the data storage computing device 18 continues the first, sorting stage of scavenging for other buffers in the set of global recycle queues 400.

Figure 3D:
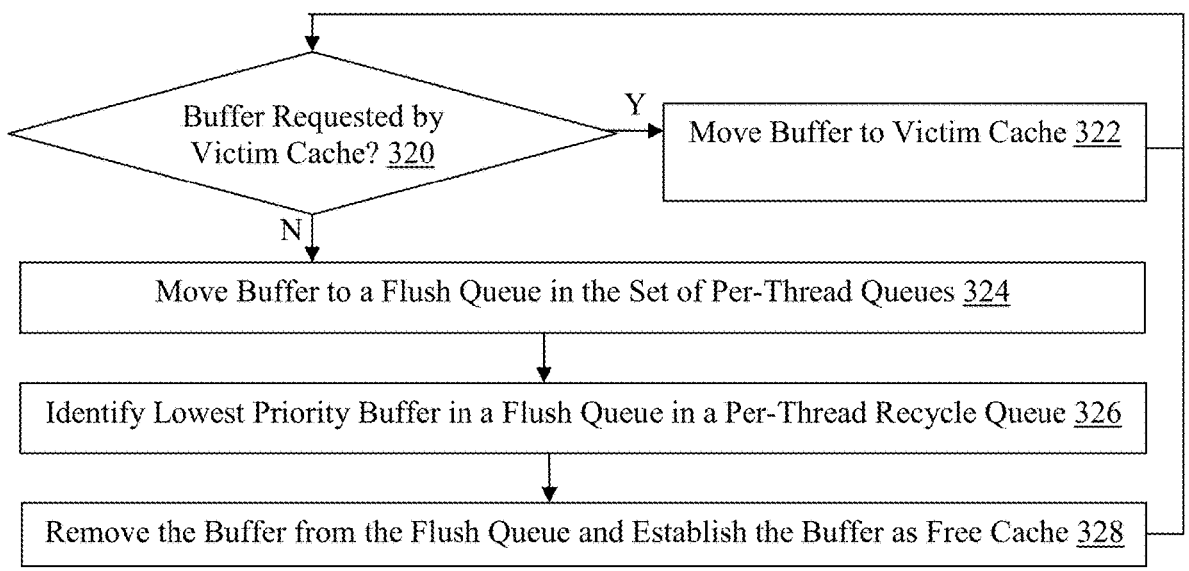

Referring to FIG. 3D, an exemplary method of scavenging a buffer in one of the sets of per-thread recycle queue 502(1)-502(n) is illustrated. In step 320, the data storage computing device 18 determines whether a buffer is requested by the victim cache 42. The buffer can be the buffer inserted in step 302 and/or identified in step 308, or the buffer can be any other buffer held by any pre-flush queue in a set of per-thread recycle queues for any thread.

The buffer is offered to the victim cache 42 prior to the buffers being scavenged and returned to a free pool, in order to maintain the associated data in a storage medium that is slower than the buffer cache 40, but faster than the disk storage devices 36. Accordingly, if the data storage computing device 18 determines that the buffers has been requested by the victim cache 42, then the Yes branch is taken to step 322. In step 322, the data storage computing device 18 moves the buffer to the victim cache 42.

Figure 10:
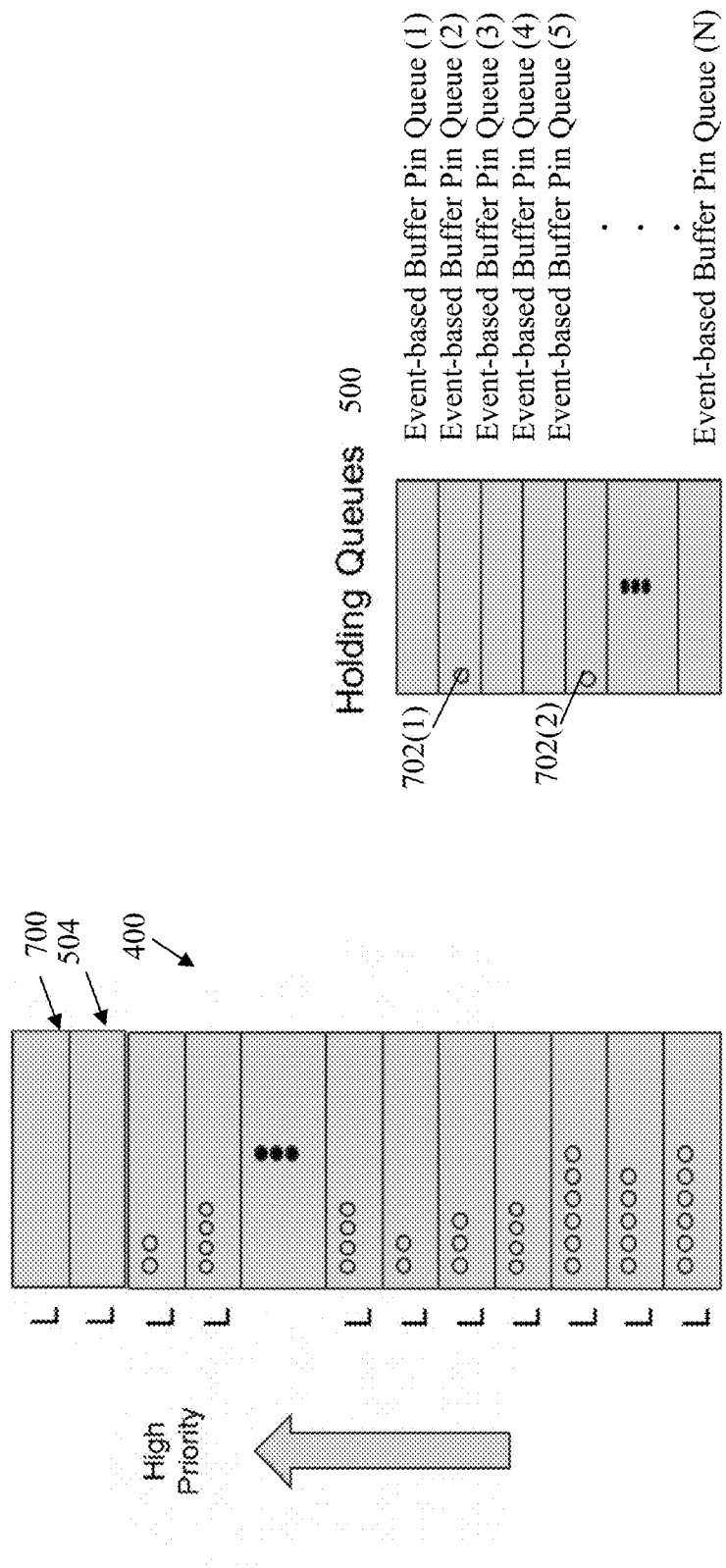
FIG. 10 is a block diagram of the exemplary set of global recycle queues, the exemplary set of holding queues, and the exemplary set of per-thread recycle queues subsequent to moving a buffer to a victim cache.
Figure 10:
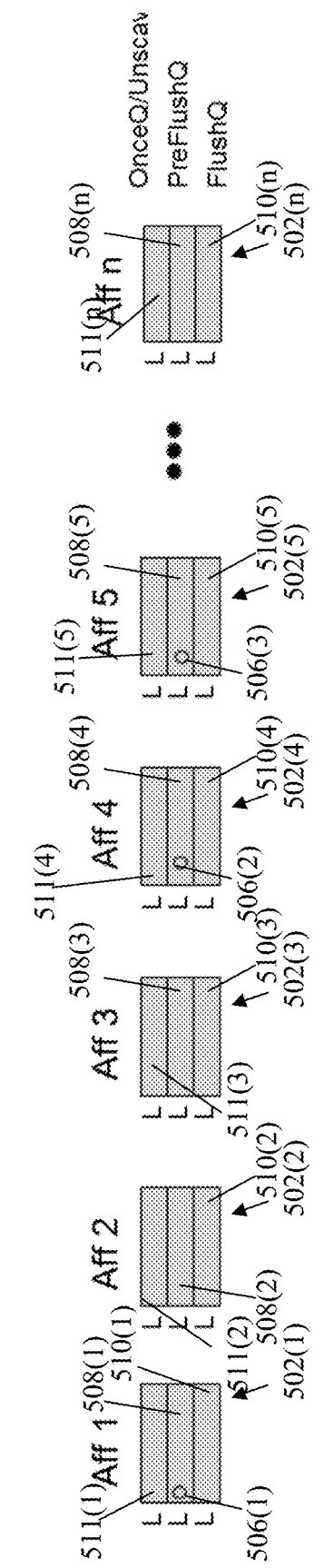

Referring to FIG. 10, a block diagram of the exemplary set of global recycle queues 400, the exemplary set of holding queues 500, and the exemplary set of per-thread recycle queues 502(1)-502(n) subsequent to moving the buffer 506(4) to the victim cache 42 is illustrated. In this example, the buffer 506(4), which was present in the pre-flush queue 508(n), as illustrated in FIG. 9, is removed from the pre-flush queue 508(n) and inserted into the victim cache 42.

Figure 11:
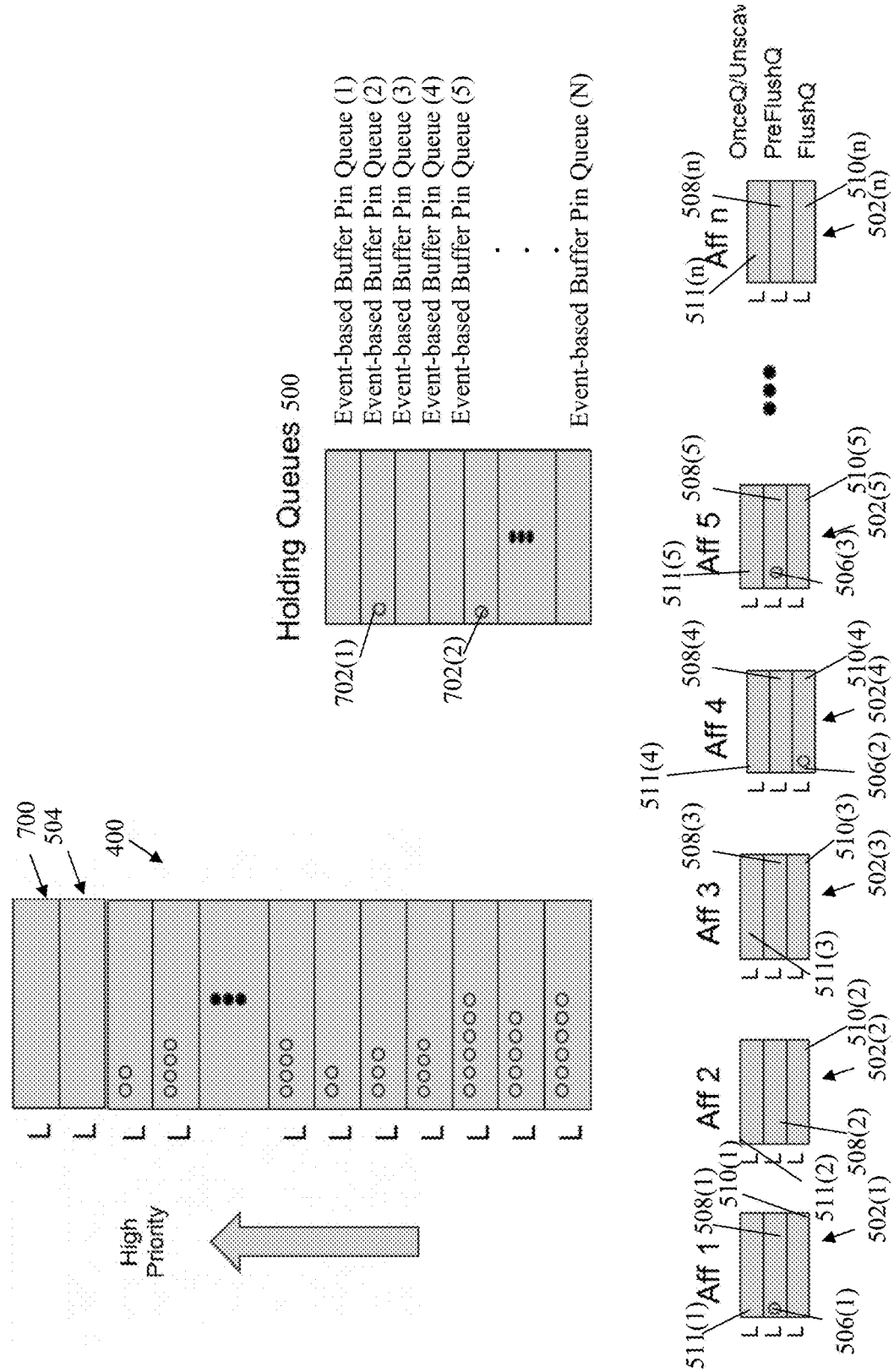
FIG. 11 is a block diagram of the exemplary set of global recycle queues, the exemplary set of holding queues, and the exemplary set of per-thread recycle queues subsequent to moving a buffer to a flush queue of a set of per-thread recycle queues.

Referring back to FIG. 3D, if the data storage computing device 18 determines in step 320 that the buffer is not requested by the victim cache 42, then the No branch is taken to step 324. In step 324, the data storage computing device 18 moves the buffer to a flush queue in the same set of per-thread recycle queues for the corresponding thread. Referring to FIG. 11, a block diagram of the exemplary set of global recycle queues 400, the exemplary set of holding queues 500, and the exemplary set of per-thread recycle queues 502(1)-502(n) subsequent to moving the buffer 506(2) to the flush queue 510(4) of the set of per-thread recycle queues 502(4) is illustrated. In this particular example, the buffer 506(2) was offered to the victim cache 42 but the victim cache 42 did not request it and it was therefore moved to the flush queue 510(4) of the set of per-thread recycle queues 502(4).

Referring back to FIG. 3D, in step 326, the data storage computing device 18 identifies a lowest priority buffer in a flush queue in a per-thread recycle queue. In some examples, the lowest priority buffer is identified in a flush queue having the most buffers than other flush queues in sets of per-thread flush queues corresponding to other threads. In these examples, buffers are scavenged from the thread currently using the most buffers or having the most buffers available for returning to a free pool, which results in a relatively fair scavenging. However, other methods for identifying the next buffer to be scavenged and returned to a free pool can also be used in other examples.

In step 328, the data storage computing device 18 removes the buffer identified in step 326 from the flush queue and places the buffer in a free pool. The buffer can be placed in the free pool by removing any pointers associated with the buffer that identify any other buffers and the pointers associated with any other buffers that identify the buffer. Accordingly, if the buffer is not linked to any other buffers, then it is available to the cache management module 38 for recycling and reuse as described and illustrated earlier with reference to FIG. 3A. In other examples, the buffer can be marked as available for reuse and other methods for returning the buffer to the free pool can also be used. Subsequent to removing the buffer in step 328, or moving the buffer to the victim cache 42 in step 322, the data storage computing device 18 proceeds back to step 320 and continues the second scavenging stage with respect to other buffers.

Figure 12:
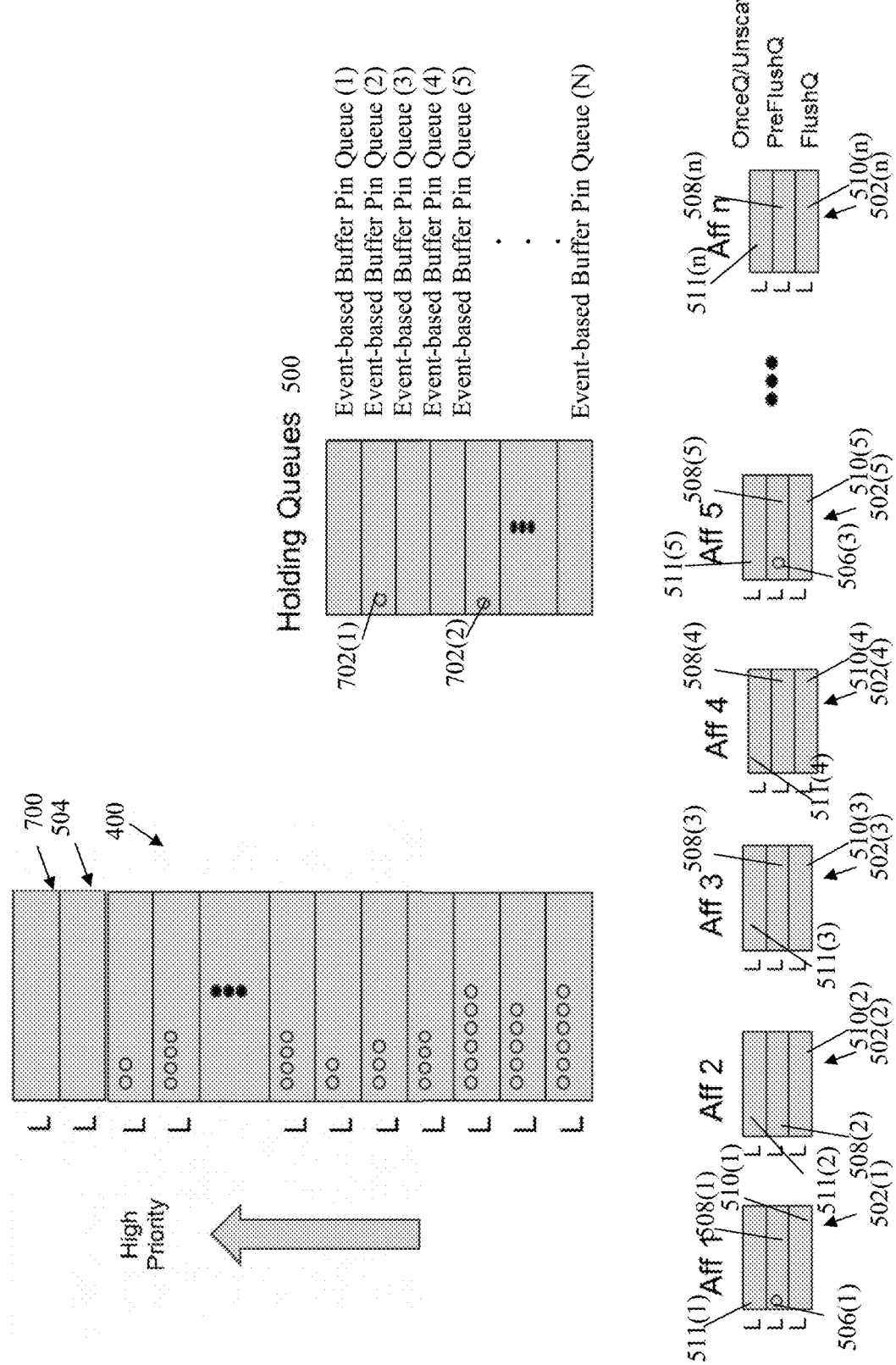
FIG. 12 is a block diagram of the exemplary set of global recycle queues, the exemplary set of holding queues, and the exemplary set of per-thread recycle queues subsequent to scavenging a buffer and returning the buffer to a free pool.

Referring to FIG. 12, a block diagram of the exemplary set of global recycle queues 400, the exemplary set of holding queues 500, and the exemplary set of per-thread recycle queues 502(1)-502(n) subsequent to scavenging the buffer 506(2) and returning the buffer 506(2) to a free pool is illustrated. In this particular example, the data storage computing device determined that a buffer should be removed from the flush queue 510(4) and identified the buffer 506(2) as the least recently used buffer in the flush queue 510(4). Accordingly, the data storage computing device 18 removed the buffer 506(2) from the flush queue 510(4) and thereby returned the buffer 506(2) to the free pool so that it is available for reuse by the same or another thread executing on one of the processors 24(1)-24(n). Therefore, the flush queue 510(4) is illustrated in FIG. 12 without the buffer 506(2).

Accordingly, with this technology, a buffer cache can be more effectively and efficiently managed resulting in improved performance for the threads utilizing the buffer cache. In particular, this technology facilitates relatively inexpensive implicit aging of buffers without requiring any walking of recycle queues. Distributed scavenging is also improved and lock contention can be reduced with this technology. Additionally, this technology allows partitioning of buffers into holding queues so that more important buffers associated with a thread are not scavenged prior to less important buffers associated with another thread.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
   identifying, by a data storage computing device, a first global recycle queue in a set of global recycle queues based on a buffer priority to store data obtained by the data storage computing device, the buffer priority based on data type,
   wherein the global recycle queues are arranged within a circular data structure such that a head pointer points to a lowest priority global recycle queue and a position of each global recycle queue within the circular data structure is indicative of a priority level of each global recycle queue;
   wherein the circular data structure includes an insertion window having a subset of the set of the global recycle queues for randomly accepting buffers of same priority;
   wherein the head pointer is moved within the circular data structure from lower priority to higher priority, to promote and demote, the set of global recycle queues without evaluating an age of each global recycle queue;
   inserting, by the data storage computing device, the buffer and metadata associated with the buffer into the first global recycle queue using the insertion window, based on the buffer priority, wherein the metadata includes a thread identifier corresponding to a first thread from a plurality of threads executed by a plurality of processors of the data storage computing device, the first thread associated with the data, and the metadata indicates whether the buffer is eligible for scavenging;
   determining, by the data storage computing device, that the first global recycle queue has become a lowest priority queue of the set of global recycle queues, based on the head pointer location, and when the buffer is a least recently used buffer in the first global recycle queue;
   determining, by the data storage computing device, whether the buffer is scavengable, based on the metadata;
   wherein the buffer is moved to a holding queue, when the buffer is not scavengable, and when the buffer is scavengable, the buffer is moved to a first pre-flush recycle queue of a per-thread recycle queue set of the first thread;
   moving, by the data storage computing device, the head pointer to a next global recycle queue, when the first global recycle queue is determined to be empty; and
   scavenging, by the data storage computing device, the buffer from the first pre-flush recycle queue, when the buffer has a lowest priority in the first pre-flush recycle queue, wherein the buffer is scavenged by removing the buffer from the first pre-flush recycle queue to a first flush queue of the per-thread recycle queue set of the first thread, and placing the buffer in a free pool, when the buffer has a lowest priority in the first flush queue.

2. The method of claim 1, wherein the buffer has a lowest priority in the first pre-flush recycle queue when the buffer is least recently used.

3. The method of claim 1, further comprises:
   determining, by the data storage computing device, whether the buffer is requested by a victim cache; and
   removing, by the data storage computing device, the buffer from either the first global recycle queue or the first pre-flush recycle queue, prior to the scavenging, and moving the buffer to the victim cache, when the determining indicates the buffer is requested by the victim cache.

4. The method of claim 1, wherein prior to the scavenging, the buffer is moved from the holding queue to a victim cache, when the buffer is requested by the victim cache.

5. The method of claim 1, further comprising:
promoting, by the data storage computing device, the buffer to a higher priority in response to a determination that the buffer has been accessed a threshold number of times;
wherein to promote the buffer, the first thread takes a lock on a second global recycle queue of a higher priority than the first global recycle queue indicated by a position of the second global recycle queue within the circular data structure.

6. The method of claim 1, wherein the buffer from the holding queue is released for scavenging when the buffer becomes eligible for scavenging.

7. The method of claim 1, wherein the per-thread recycle queue set of the first thread includes a once queue with buffers that are expected to be accessed only once and then scheduled for scavenging after being accessed once.

8. A non-transitory computer readable medium having stored thereon instructions comprising executable code, which when executed by a processor, causes the processor to perform a method comprising:
identifying a first global recycle queue in a set of global recycle queues based on a buffer priority to store data obtained by a data storage computing device, the buffer priority based on data type,
wherein the global recycle queues are arranged within a circular data structure such that a head pointer points to a lowest priority global recycle queue and a position of each global recycle queue within the circular data structure is indicative of a priority level of each global recycle queue;
wherein the circular data structure includes an insertion window having a subset of the set of the global recycle queues for randomly accepting buffers of same priority;
wherein the head pointer is moved within the circular data structure from lower priority to higher priority, to promote and demote, the set of global recycle queues without evaluating an age of each global recycle queue;
inserting the buffer and metadata associated with the buffer into the first global recycle queue using the insertion window, based on the buffer priority, wherein the metadata includes a thread identifier corresponding to a first thread from a plurality of threads executed by a plurality of processors of the data storage computing device, the first thread associated with the data, and the metadata indicates whether the buffer is eligible for scavenging;
determining that the first global recycle queue has become a lowest priority queue of the set of global recycle queues, based on the head pointer location, and when the buffer is a least recently used buffer in the first global recycle queue;
determining whether the buffer is scavengable, based on the metadata;
wherein the buffer is moved to a holding queue, when the buffer is not scavengable; and when the buffer is scavengable, the buffer is moved to a first pre-flush recycle queue of a per-thread recycle queue set of the first thread;
moving the head pointer to a next global recycle queue, when the first global recycle queue is determined to be empty; and
scavenging the buffer from the first pre-flush recycle queue when the buffer has a lowest priority in the first pre-flush recycle queue, wherein the buffer is scavenged by removing the buffer from the first pre-flush recycle queue to a first flush queue of the per-thread recycle queue set of the first thread, and placing the buffer in a free pool, when the buffer has a lowest priority in the first flush queue.

9. The non-transitory computer readable medium of claim 8, wherein the buffer has a lowest priority in the first pre-flush recycle queue when the buffer is least recently used.

10. The non-transitory computer readable medium of claim 8, wherein the method further comprising:
determining whether the buffer is requested by a victim cache; and
removing the buffer from either the first global recycle queue or the first pre-flush recycle queue, prior to the scavenging, and moving the buffer to the victim cache, when the determining indicates the buffer is requested by the victim cache.

11. The non-transitory computer readable medium of claim 8, wherein prior to the scavenging, the buffer is moved from the holding queue to a victim cache, when the buffer is requested by the victim cache.

12. The non-transitory computer readable medium of claim 8, wherein the method further comprising:
promoting the buffer to a higher priority in response to a determination that the
buffer has been accessed a threshold number of times;
wherein to promote the buffer, the first thread takes a lock on a second global recycle queue of a higher priority than the first global recycle queue indicated by a position of the second global recycle queue within the circular data structure.

13. The non-transitory computer readable medium of claim 8, wherein the buffer from the holding queue is released for scavenging when the buffer becomes eligible for scavenging.

14. The non-transitory computer readable medium of claim 8, wherein the per-thread recycle queue set of the first thread includes a once queue with buffers that are expected to be accessed only once and then scheduled for scavenging after being accessed once.

15. A data storage computing device, comprising a memory containing machine readable medium comprising machine executable code having stored thereon instructions; and a processor coupled to the memory, the processor configured to execute the machine executable code to:
identify a first global recycle queue in a set of global recycle queues based on a buffer priority to store data obtained by a data storage computing device, the buffer priority based on data type,
wherein the global recycle queues are arranged within a circular data structure such that a head pointer points to a lowest priority global recycle queue and a position of each global recycle queue within the circular data structure is indicative of a priority level of each global recycle queue;
wherein the circular data structure includes an insertion window having a subset of the set of the global recycle queues for randomly accepting buffers of same priority;
wherein the head pointer is moved within the circular data structure from lower priority to higher priority, to promote and demote, the set of global recycle queues without evaluating an age of each global recycle queue;
insert the buffer and metadata associated with the buffer into the first global recycle queue using the insertion window, based on the buffer priority, wherein the metadata includes a thread identifier corresponding to a first thread from a plurality of threads executed by a plurality of processors of the data storage computing device, the first thread associated with the data, and the metadata indicates whether the buffer is eligible for scavenging;

determine that the first global recycle queue has become a lowest priority queue of the set of global recycle queues, based on the head pointer location, and when the buffer is a least recently used buffer in the first global recycle queue;

determine whether the buffer is scavengable, based on the metadata;

wherein the buffer is moved to a holding queue, when the buffer is not scavengable; and when the buffer is scavengable, the buffer is moved to a first pre-flush recycle queue of a per-thread recycle queue set of the first thread;

move the head pointer to a next global recycle queue, when the first global recycle queue is determined to be empty; and scavenge the buffer from the first pre-flush recycle queue when the buffer has a lowest priority in the first pre-flush recycle queue, wherein the buffer is scavenged by removing the buffer from the first pre-flush recycle queue to a first flush queue of the per-thread recycle queue set of the first thread, and placing the buffer in a free pool, when the buffer has a lowest priority in the first flush queue.

16. The data storage computing device of claim 15, wherein the buffer has a lowest priority in the first pre-flush recycle queue when the buffer is least recently used.

17. The data storage computing device of claim 15, wherein the processor further causes the machine executable code to:

determine whether the buffer is requested by a victim cache; and remove the buffer from either the first global recycle queue or the first pre-flush recycle queue, prior to the scavenging, and moving the buffer to the victim cache, when the determining indicates the buffer is requested by the victim cache.

18. The data storage computing device of claim 15, wherein prior to the scavenging, the buffer is moved from the holding queue to a victim cache, when the buffer is requested by the victim cache.

19. The data storage computing device of claim 15, wherein the processor further causes the machine executable code to:

promote the buffer to a higher priority in response to a determination that the buffer has been accessed a threshold number of times;

wherein to promote the buffer, the first thread takes a lock on a second global recycle queue of a higher priority than the first global recycle queue indicated by a position of the second global recycle queue within the circular data structure.

20. The data storage computing device of claim 15, wherein the buffer from the holding queue is released for scavenging when the buffer becomes eligible for scavenging.

* * * * *